United States Patent
Lu et al.

(10) Patent No.: US 10,282,860 B2
(45) Date of Patent: May 7, 2019

(54) MONOCULAR LOCALIZATION IN URBAN ENVIRONMENTS USING ROAD MARKINGS

(71) Applicant: HONDA MOTOR CO., LTD., Minato-ku, Tokyo (JP)

(72) Inventors: Yan Lu, Raymond, OH (US); Jiawei Huang, Raymond, OH (US); Yi-Ting Chen, Sunnyvale, CA (US); Bernd Heisele, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 15/601,638

(22) Filed: May 22, 2017

(65) Prior Publication Data

US 2018/0336697 A1 Nov. 22, 2018

(51) Int. Cl.
| | |
|---|---|
| *G01S 17/89* | (2006.01) |
| *G01S 17/88* | (2006.01) |
| *G06T 7/73* | (2017.01) |
| *G01S 17/02* | (2006.01) |
| *G06T 7/13* | (2017.01) |

(52) U.S. Cl.
CPC .............. *G06T 7/73* (2017.01); *G01S 17/023* (2013.01); *G01S 17/89* (2013.01); *G06T 7/13* (2017.01); *G06T 2207/30244* (2013.01); *G06T 2207/30252* (2013.01)

(58) Field of Classification Search
CPC .... G06T 7/32; G06T 7/70; G06T 7/73; G06T 7/74; G06T 7/75; G06T 7/77; G06T 7/246; G06T 7/248; G06T 7/251; G06T 7/33; G06T 7/35; G06T 17/88

USPC .................. 382/103–104, 106, 109–194, 113
See application file for complete search history.

(56) References Cited

U.S. PATENT DOCUMENTS

| | | | |
|---|---|---|---|
| 8,280,105 B2 | 10/2012 | Kishikawa et al. | |
| 9,148,650 B2 | 9/2015 | Chandraker et al. | |
| 9,886,530 B2 * | 2/2018 | Mehr | G06F 17/50 |

(Continued)

FOREIGN PATENT DOCUMENTS

AU 2009211435 A1 8/2009

OTHER PUBLICATIONS

Rachid Belaroussi et al., "Vehicle Attitude Estimation in Adverse Weather Conditions Using a Camera, a GPS and a 3D Road Map", IEEE Intelligent Vehicles Symposium (IV), pp. 782-787, 2011.

(Continued)

*Primary Examiner* — Dwayne D Bost
*Assistant Examiner* — Stephen M Brinich
(74) *Attorney, Agent, or Firm* — Arent Fox LLP (57) ABSTRACT

The present disclosure relates to methods and systems for monocular localization in urban environments. The method may generate an image from a camera at a pose. The method may receive a pre-generated map, and determine features from the generated image based on edge detection. The method may predict a pose of the camera based on at least the pre-generated map, and determine features from the predicted camera pose. Further, the method may determine a Chamfer distance based upon the determined features from the image and the predicted camera pose, optimize the determined Chamfer distance based upon odometry information and epipolar geometry. Upon optimization, the method may determine an estimated camera pose.

21 Claims, 7 Drawing Sheets

(56) References Cited

U.S. PATENT DOCUMENTS

| | | |
|---|---|---|
| 2005/0190972 A1 | 9/2005 | Thomas et al. |
| 2008/0243378 A1 | 10/2008 | Zavoli |
| 2015/0347846 A1* | 12/2015 | Guzm n-Rivera ... G06K 9/6256 382/103 |
| 2016/0171765 A1* | 6/2016 | Mehr ....................... G06F 17/11 345/419 |
| 2016/0209646 A1 | 7/2016 | Eustice et al. |
| 2017/0169300 A1* | 6/2017 | Heisele .............. G06K 9/00791 |

OTHER PUBLICATIONS

Tao Wu et al., "Vehicle Localization Using Road Markings", IEEE Intelligent Vehicles Symposium, IV, pp. 1185-1190, 2013.

* cited by examiner

| Solid lines | Broken lines |
|---|---|
| {FeatureCode} Line_DivisionCom | {FeatureCode} Line_DivisionBrk |
| {FeatureType} 3DLine | {FeatureType} 3DLine |
| {FeatureTypeVer} 2013_04 | {FeatureTypeVer} 2013_04 |
| {FormType} 3DLine | {FormType} 3DLine |
| {FID} 000215 | {FID} 000144 |
| {3DPolyline} | {3DPolyline} |
| -5460.2192,-35345.4338,40.7747 | 1862483.5291,600529.2792,-12.8697 |
| -5460.6251,-35345.8541,40.7708 | 1862480.9886,600532.3923,-12.9198 |
| {Width} 0.15 | 1862477.5812,600534.6529,-12.9240 |
| {ColorCode} W | 1862473.9232,600537.0613,-12.9419 |
| {LineClass} 1 | 1862471.2528,600538.7918,-12.9972 |
| {RoadDivCode} 102 | 1862467.9661,600540.8946,-13.0289 |
| {RoadRegulationCode} | 1862465.3214,600542.5220,-13.0386 |
| {RoadIndicationCode} 206 | 1862461.4600,600544.8773,-13.0873 |
| {FID} 000216 | 1862458.8722,600546.4386,-13.1046 |
| {3DPolyline} | 1862454.7321,600548.8735,-13.1440 |
| -5461.6899,-35343.4173,40.7741 | 1862452.3146,600550.2654,-13.1891 |
| -5462.0432,-35343.8179,40.7802 | {Width} 0.15 |
| {Width} 0.15 | {ColorCode} Y |
| {ColorCode} W | {LineClass} 2 |
| {LineClass} 1 | {RoadDivCode} 103 |
| {RoadDivCode} 103 | {RoadRegulationCode} |
| {RoadRegulationCode} | {RoadIndicationCode} |
| {RoadIndicationCode} 206 | |

MONOCULAR LOCALIZATION IN URBAN ENVIRONMENTS USING ROAD MARKINGS

BACKGROUND

The development of self-driving cars has progressed significantly due to the expansion in perception, motion planning and control, and/or emerging sensing technologies. To achieve autonomous navigation, accurate localization may be used. While a Global Positioning System ("GPS") may be used, it may suffer from multipath effects in urban environments. Alternatives may be used for localization in GPS-challenged environments.

Localization may match sensor observations against an a priori known map. Maps may be generated by human surveying or robotic mapping using different sensors. Cameras and light detection and ranging ("LiDAR") are two common perception sensors. LiDAR may be used for mapping because it generally provides accurate range measurements. A common approach may be to use LiDAR in the mapping process as well as localization. However, the cost of LiDAR may be prohibitively high for wide ranging applications. On the other hand, cameras are low-cost and lightweight, but visual mapping is challenging due, in part, to the lack of direct range measurement. The challenge becomes matching measurements against maps that may be constructed using different sensing modalities.

In view of the foregoing, there may be a need for ways to more accurately implement localization for autonomous vehicles. Further advantages and novel features will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method for localization by generating an image from a camera at a pose. The method further receives a pre-generated map and determines features from the generated image based on edge detection. The method predicts a pose of the camera based on at least the pre-generated map, and determines features from the predicted camera pose. Further, the method determines a Chamfer distance based upon the determined features from the image and the predicted camera pose, and optimizes the determined Chamfer distance based upon odometry information and epipolar geometry. Upon optimization, the method generates a camera pose estimate based on the optimization.

In another aspect, the disclosure provides a system for localization comprising a camera for generating an image at a pose, a memory and processor coupled to the memory. The system is configured to receive a pre-generated map, determine features from the generated image based on edge detection, predict a pose of the camera based on at least the pre-generated map. The system is further configured to determine features from the predicted camera pose and determine a Chamfer distance based upon the determined features from the image and the predicted camera pose. The system is further configured to optimize the determined Chamfer distance based upon odometry information and epipolar geometry, generate a camera pose estimate based on the optimized data.

In another aspect, the disclosure provides a non-transitory computer-readable recording medium having stored therein a program, which when executed by circuitry of a system, causes the system to generate an image from a camera at a pose. The system is configured to receive a pre-generated map, determine features from the generated image based on edge detection, predict a pose of the camera based on at least the pre-generated map. The system is further configured to determine features from the predicted camera pose and determine a Chamfer distance based upon the determined features from the image and the predicted camera pose. The system is further configured to optimize the determined Chamfer distance based upon odometry information and epipolar geometry, generate a camera pose estimate based on the optimized data.

These and other aspects of the disclosure will become more fully understood upon a review of the detailed description, which follows.

BRIEF DESCRIPTION OF THE DRAWINGS

The novel features believed to be characteristic of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Localization is performed in autonomous navigation of self-driving cars. The essence of a localization process is to match sensor measurements against predetermined maps. Maps may be generated by human surveying or robotic mapping using different sensors. In other words, localization techniques may be classified by the sensing modalities and map representations.

One type of localization technique may utilize the same type of sensor for both localization and mapping. By using the same type of sensor for both processes, the matching problem may be largely simplified. For example, 3D LiDAR (e.g., Velodyne) may be used for both processes, as 3D LiDAR employs a high precision of range measurements. 3D LiDAR may be implemented to first map road surfaces and then localize a vehicle by correlating ground reflectivity. In another example, 3D LiDAR may be used to generate 3D maps represented by Gaussian mixtures, and localization is performed by registering 3D point clouds with maps.

A second type of localization technique may utilize low-cost and lightweight cameras for visual localization using visual landmarks. For example, a database of visual landmarks may be created from scale-invariant feature transform ("SIFT") points. The camera may then be localized by SIFT matching. Another example localizes a camera by matching the current image against an image database using bag-of-words techniques.

There are drawbacks of using a camera for both localization and mapping. First, it may be difficult to obtain high accuracy in visual mapping, simultaneous localization and mapping ("SLAM"), because cameras do not have the capability to observe range information. Second, visual matching quality in localization may easily be affected by time, perspective and illumination changes.

By using different sensing modalities in localization and mapping, the limitations mentioned above may be overcome. For example, by adopting low-cost sensors (e.g., cameras) for localization and high-cost sensors (e.g., LiDAR) for mapping, estimation of a camera pose may be improved.

The rationale for using different sensing modalities in localization and mapping, is based onis that while maps need to be very accurate, they do not need to be generated/updated as frequently as localization. Thus, a monocular camera may be used to localize itself in a map, generated by high accuracy LiDAR.

Figure 1:
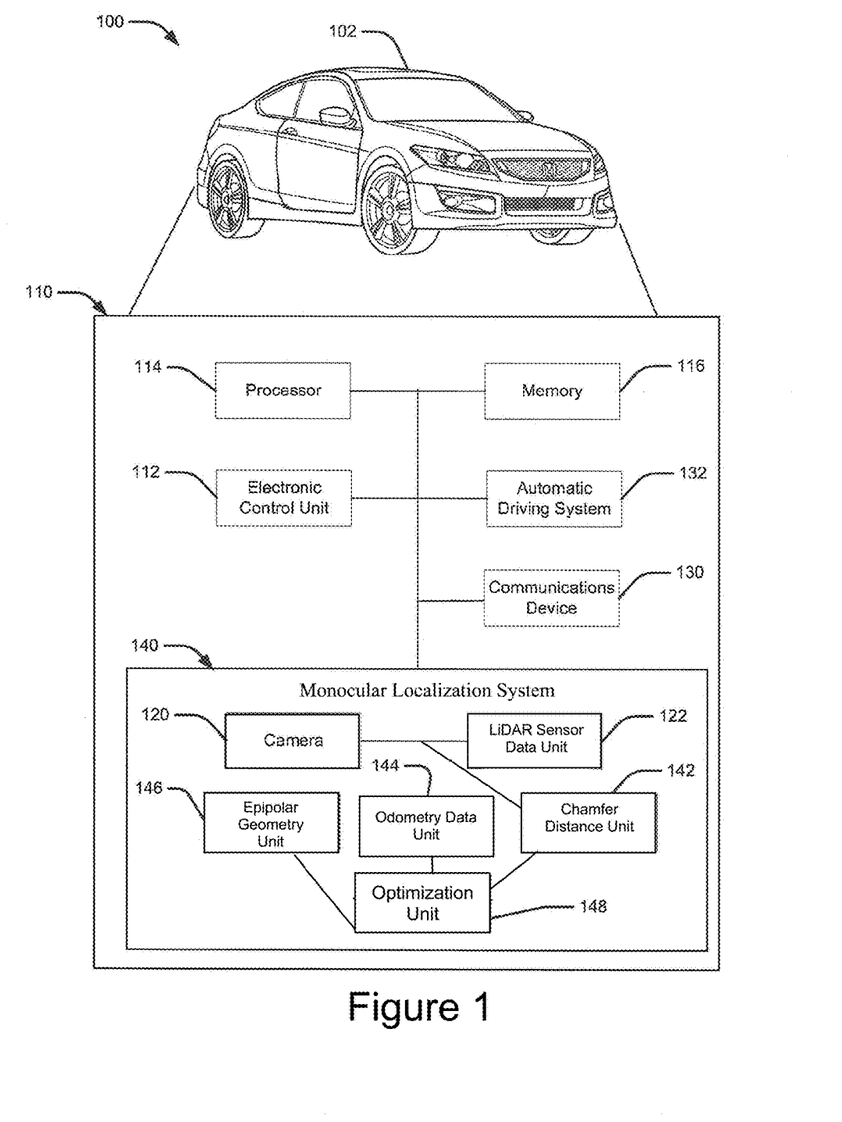
FIG. 1 illustrates a schematic view of an example operating environment of an optimization based localization system in accordance with aspects of the present disclosure.

Turning to FIG. 1, a schematic view of an example operating environment 100 of a localization system 110 for localization in urban environments using road marking according to an aspect of the disclosure is provided. The localization system 110 may reside within a vehicle 102. The components of the localization system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the localization system 110 including a monocular localization system 140, among others, including vehicle HVAC systems, vehicle audio systems, vehicle video systems, vehicle infotainment systems, vehicle telephone systems, and the like. The monocular localization system 140 may include a monocular camera 120 or other image-capturing device (e.g., a scanner) that may also be connected to the ECU 112 to provide images of the environment surrounding the vehicle 102, as described in further detail below.

The monocular localization system 140 may also include LiDAR sensor data unit 122, which may have been captured by a mapping company and may consist of a variety of elements including road markings, curbs, traffic signs, etc. Further, as described in more detail below, epipolar geometry unit 146, odometry unit 144, and a Chamfer distance unit 142, may also be utilized for optimization.

The monocular localization system 140 may also include an optimization unit, described in detail below, for estimation of a camera pose based on the inputs of the epipolar geometry unit 146, the odometry data unit 144 and the Chamfer distance unit 142.

The localization system 110 may also include a processor 114 and a memory 116 that communicates with a camera 120, a LiDAR sensor data unit 122, a communications device 130, and an automatic driving system 132.

The ECU 112 may include internal processing memory, an interface circuit, and bus lines for transferring data, sending commands, and communicating with the vehicle systems. The ECU 112 may include an internal processor and memory (not shown). The vehicle 102 may also include a bus for sending data internally among the various components of the localization system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include at least one camera 120. The camera 120 may be a digital camera capable of capturing one or more images or image streams, or may be another image capturing device, such as a scanner. The camera 120 may provide an image of a space directly in front of the vehicle 102. Other cameras may provide images of other spaces surrounding the vehicle 102. For example, a rear camera may be located above a bumper of the vehicle. The camera 120 may be a monocular camera and provide an image in 2D.

The vehicle 102 may include an automatic driving system 132 for controlling the vehicle 102. The automatic driving system 132 may include a lane keeping assistance system, a collision warning system, or a fully autonomous driving system, among other systems. The automatic driving system 132 may receive object position and orientation information from the localization system 140. In an aspect, the localization system 140 may be a component of the automatic driving system 132.

Figure 2:
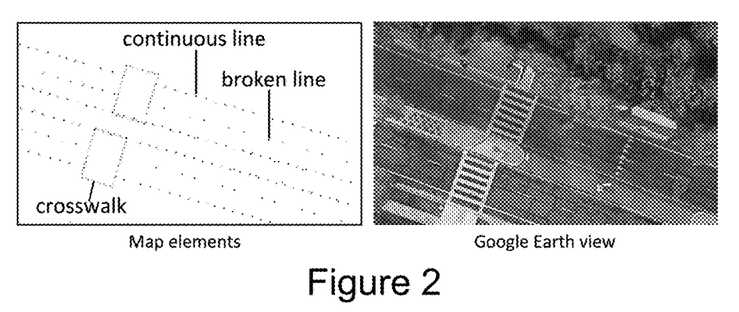
FIG. 2 illustrates an example of map elements used for localization in accordance with aspects of the present disclosure.

FIG. 2 illustrates an example of map elements generated from a map used for localization. The map may be provided by mapping companies (e.g., Google), and may consist of a variety of map elements including road markings, curbs, traffic signs, etc. For example, for purposes of simplicity, two types of map elements may be determined and used as road markings: solid lines and broken lines ("Road Markings"). Additional types of map elements may be used as road markings, and the present disclosure is not limited to two types of map elements only.

As illustrated in FIG. 2, when determining the road markings, the solid lines may come from map elements such as a lane or crosswalk boundaries, while broken lines may typically exist between lanes. For example, by choosing this subset of map elements (e.g., solid lines and broken lines) as Road Markings, may be beneficial for the system for a variety of reasons. First, this subset of map elements may be more frequently observed than other map elements, for example, speed limit signs and turning arrows. Second, this subset of map elements is relatively easy to detect from images due to their distinctive appearance (in contrast to curbs) and large sizes (compared with traffic signs).

As illustrated in FIG. 2, the map is not generated by cameras located on the vehicle 102, but rather by other sensing equipment (e.g., 3D LiDAR). The LiDAR sensor data obtained by the vehicle 102 may be stored in LiDAR Sensor Data Unit 122, as shown in FIG. 1. The map may be constructed by manually labeling landmarks in a 3D environment created by registering a 3D LiDAR point cloud. As shown in FIG. 2, the map may consist of sparse 3D points representing the Road Markings.

Figure 3:
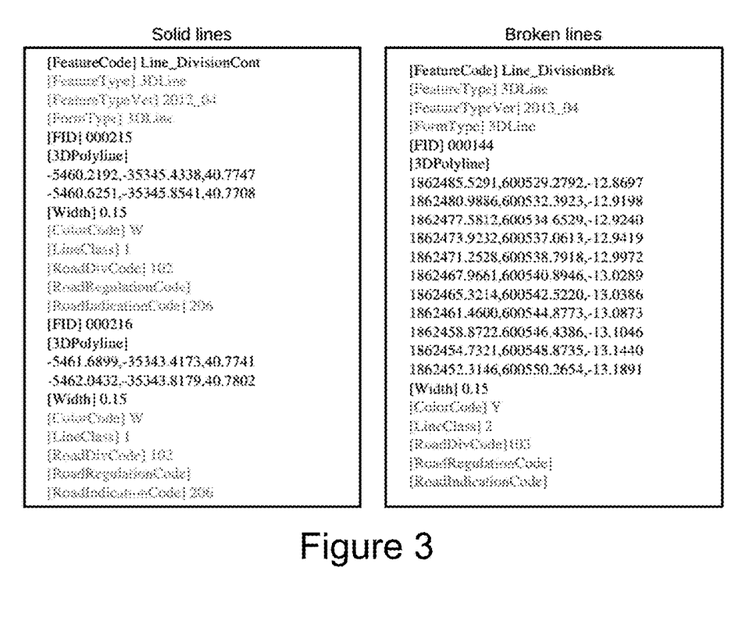
FIG. 3 illustrates an example of map elements stored in a text format in accordance with aspects of the present disclosure.

FIG. 3 illustrates an example of Road Markings stored as a text. The Road Markings as sparse points, as illustrated in FIG. 2, may be concisely stored in text files, and may be grouped by geographic locations. As illustrated in FIG. 3, Road Marking may be represented by a set of 3D sparse points, sampled along their center line, along with other information such as width and color. These text files may be stored in LiDAR Sensor Data Unit 122, as shown in FIG. 1.

Figure 4:
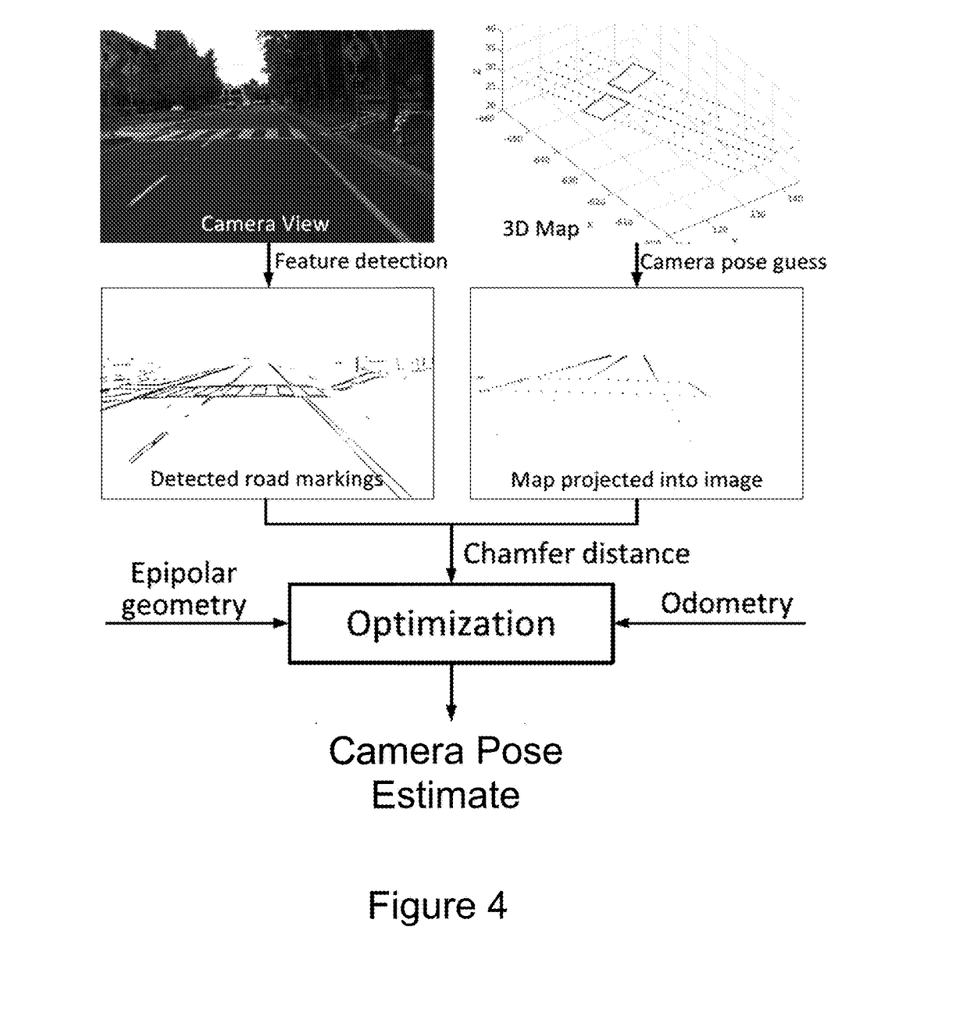
FIG. 4 illustrates a conceptual diagram showing an overall architecture for an optimization based localization system in accordance with aspects of the present disclosure.

FIG. 4 illustrates a conceptual diagram showing an overall architecture for the localization system 110. As explained in detail below, FIG. 4 illustrates a Camera View, detected by the camera 120, and a 3D Map, obtained by the sensing equipment and stored in LiDAR Sensor Data Unit 122. The monocular localization system 140 may detect edges and features from the Camera View, and a camera pose guess may be determined from the 3D Map.

Chamfer matching may be performed to register edges and map elements detected from the Camera View against a lightweight 3D map, where the Road Markings are represented as a set of sparse points, as described above. Additionally, vehicle odometry and epipolar geometry constraints may be taken into account. Further, a non-linear optimization problem may be formulated to estimate a 6 degrees of freedom ("DoF") camera pose.

Additionally, the localization system 110 may also detect matching failures and reset the system after if the matching fails, as described in detail below.

Figure 5:
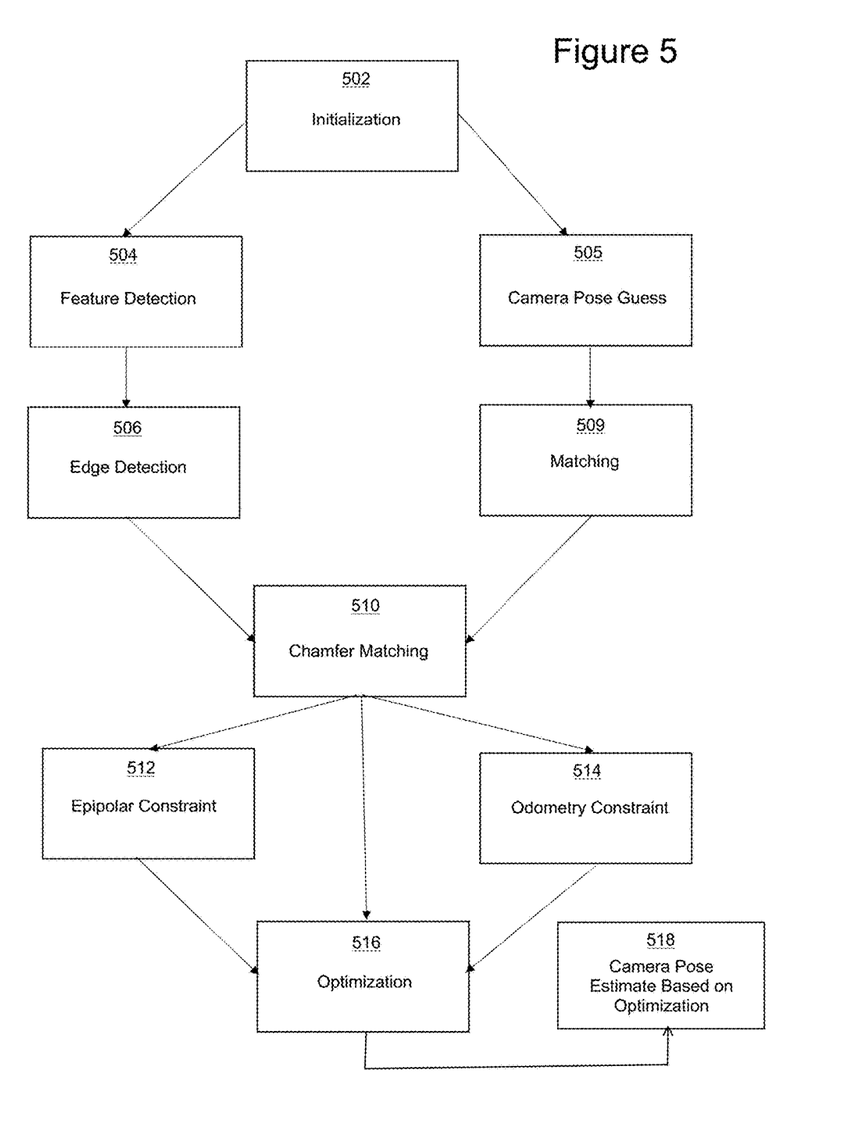
FIG. 5 illustrates a flowchart showing an example method of object detection and optimization based localization in accordance with aspects of the present disclosure.

FIG. 5 illustrates a flowchart illustrating an example method of localization in accordance with aspects of the present disclosure. At 502, the localization system 110 is initialized, as system initialization is described in detail below. At 504, time K, edges of the map elements may be detected in image $I_k$, obtained from the camera 120. At 505, at the same time K, the camera pose $P'_k$ may be predicted/guessed using the information of the last frame $P_{k-1}$, and odometry data $D_k$.

At 506, edges may be detected by extracting contours obtained from the Camera View. However, generic edge detectors produce too many irrelevant edges (i.e., false positives), thus a random forest based edge detector may be retrained based on the Camera View.

A random forest is a collection of independent decision trees. Each tree is given the same input sample and classifies it by propagating it down the tree from the root node to a leaf node. By presenting an initial untrained decision tree with many input and output mappings, the parameters of its internal splitting functions will gradually evolve and produce similar input-output mappings. This learning process is made possible by defining an information gain criterion. Parameters resulting in maximum information gain may be rewarded. Thus, as illustrated in FIG. 4, road markings may be detected from the Camera View, via feature detection, based on a random forest.

At 509, matching may be performed based on the 3D Map. As described above, Road Marking are represented by a small set of 3D points. From the odometry information, the camera pose $P'_k$ can be predicted at time K. As shown in FIG. 4, the small set of 3D points of Road Markings may be projected onto an image space.

At 510, Chamfer matching may be performed to evaluate how well the projected points determined at 509, match against the detected features at 506, to estimate a camera pose.

Chamfer matching essentially associates each projected point to a nearest edge pixel. The Chamfer distance can be efficiently computed from the Chamfer distance transform [1], described below. To account for orientation, edge pixels may be divided into different groups by their gradient direction, and a distance transform may be computed accordingly.

$$C_{chf}(P_k) = \sum_{X \in M_k} C_k(\pi(P_k, X)) \quad [1]$$

$C_k$ is the distance transform computed from the edge of the image. For any point, x on $I_k$, the Chamfer distance $C_k(x)$ may be queried from $C_k$ by interpolation. $\pi(P,X)$ is the projection function that projects a 3D point X from the frame to the image with pose P. $M_k$ is the set of Road Marking points that are in the camera view according to the predicted camera pose $P'_k$.

Additionally, Road Markings may not always pose sufficient constraints on the camera pose estimation, for example, when there are straight solid lines in the view. Therefore optimization may be necessary.

At 512, an epipolar constraint is determined by equation [2], described below. $x_{i,k-1} \leftrightarrow x_{i,k}$ are a pair of image points from $I_{k-1}$ to $I_k$, respectively, and they are correspond to the same 3D point. The epipolar constraint is:

$$\tilde{x}_{i,k-1}{}^T F \tilde{x}_{i,k} = 0 \quad [2]$$

where F is the fundamental matrix, and $\tilde{x}$ denotes the homogeneous coordinates of x. For a calibrated camera 120, F may be determined by the relative pose between two views, as follows:

$$^{k-1}R_k := R_{k-1}{}^T R_k$$

$$^{k-1}t_k := R_{k-1}{}^T R_k (t_k - t_{k-1}). \quad [3]$$

Verification can be performed such that $(^{k-1}R_k, {}^{k-1}t_k)$ is the relative rigid transformation between $P_{k-1}$ and $P_k$. The fundamental matrix may be computed as:

$$F = K^{-T} [^{k-1}t_k] \times {}^{k-1}R_k K^{-1} \quad [4]$$

where $[^{k-1}t_k] \times$ is the matrix representation of the cross product with $^{k-1}t_k$.

Given a set of point correspondences $\{x_{i,k} \leftrightarrow x_{i,k}, i=1, \ldots\}$ between $I_{k-1}$ and $I_k$, the epipolar constraint is defined as:

$$C_{spi}(P_{k-1}, P_k) = \sum_i \tilde{x}_{i,k-1}^T F \tilde{x}_{i,k}. \quad [5]$$

Speeded up robust features (SURF) points may be used in the epipolar constraints. As described above, equation [5] only poses constraints on 5 DoFs of a camera pose because a physical scale is not observable by a monocular camera. Thus, odometry may be used for an additional constraint.

At 514, an odometry constraint is determined. $D_k$ is the rigid transformation between $I_{k-1}$ and $I_k$ measured by the odometer. Since the epipolar constraint already covers 5 DoFs, as described above, only the use of translation magnitude of $D_k$ as a constraint is necessary. $d_k$ denotes the magnitude of the translation component of $D_k$. The odometry constraint may be defined as:

$$C_{odm}(P_{k-1}, P_k) = (d_k - |^{k-1}t_k|)^2. \quad [6]$$

At 516, the optimization formulation may performed. Given $P_{k-1}$, $P_k$ may be estimated by minimizing the following cost function:

$$C(P_k) = C_{chf}(P_k) + C_{epi}(P_{k-1}, P_k) + C_{odm}(P_{k-1}, P_k). \quad [7]$$

The cost function [7], determining optimization, may be solved using a Levenberg-Marquardt algorithm.

At 518, the optimized data may be utilized to determine a camera pose estimate. The camera pose estimate may be implemented onto a map.

Figure 5A:
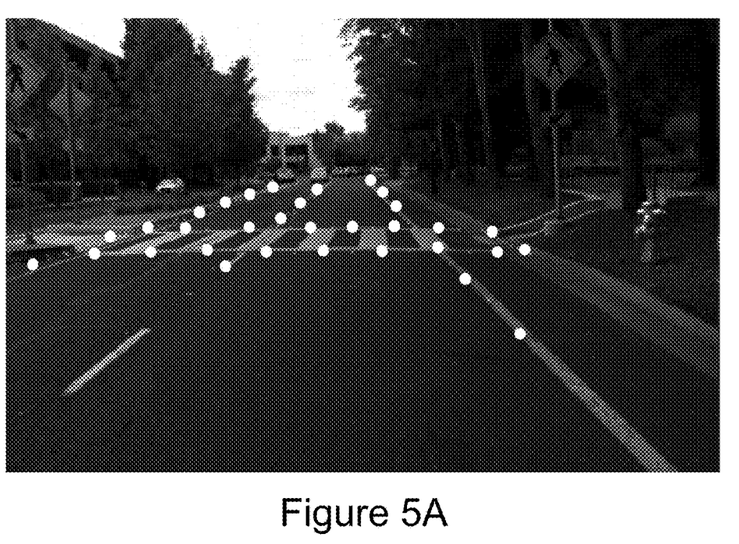
FIG. 5A illustrates an example of a map projected into a camera view implementing the camera pose obtained by optimization in accordance with aspects of the present disclosure.

FIG. 5A illustrates an example of a map projected into a camera view implementing the camera pose estimate obtained by optimization in accordance with aspects of the present disclosure.

To initialize the monocular localization system 140, an initial estimate of the camera pose may be determined. The estimated camera pose may be obtained from a GPS or another type of source. The initial camera pose estimate may be far from the true location for the optimization to perform properly. Thus, an exhaustive search may be utilized to determine a more actuate estimate. To do so, the monocular localization system 140 may randomly sample a large set of candidate poses around the initial estimate in the parameter space. The monocular localization system 140 may find an updated camera pose estimate that minimizes $C(P_k)$.

Once the monocular localization system 140 has been initialized using the best candidate as an initial solution, the system may further minimize $C(P_k)$, as explained above.

The monocular localization system 140 may also monitor the localization performance by checking the Chamfer distance. A large Chamfer distance may indicate a localization estimate. The monocular localization system 140 may be determined to have failed, e.g. improperly determining a camera pose, when consecutive large Chamfer distances are generated. In case of determined monocular localization system failure, the system may perform a reset using the same strategy as described above for initialization.

A difference between a reset and an initialization, as described above, is that the monocular localization system 140 may sample candidates around the current pose estimate, rather than starting from an unknown state.

Figure 6:
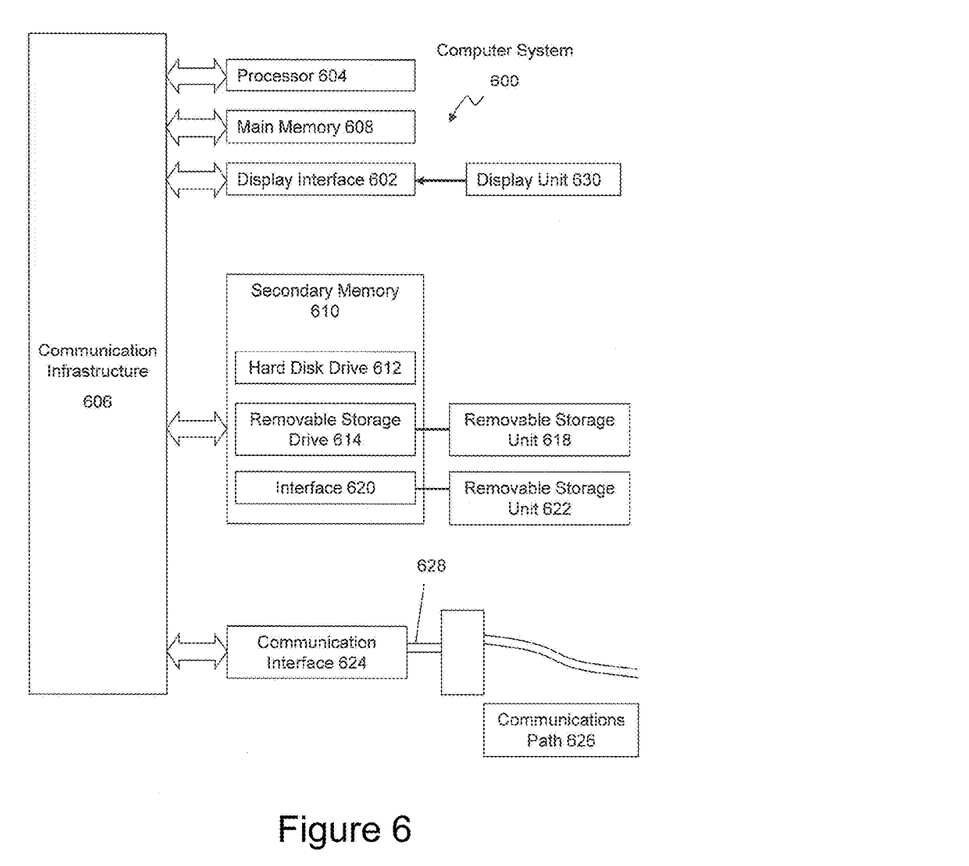
FIG. 6 presents an example system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
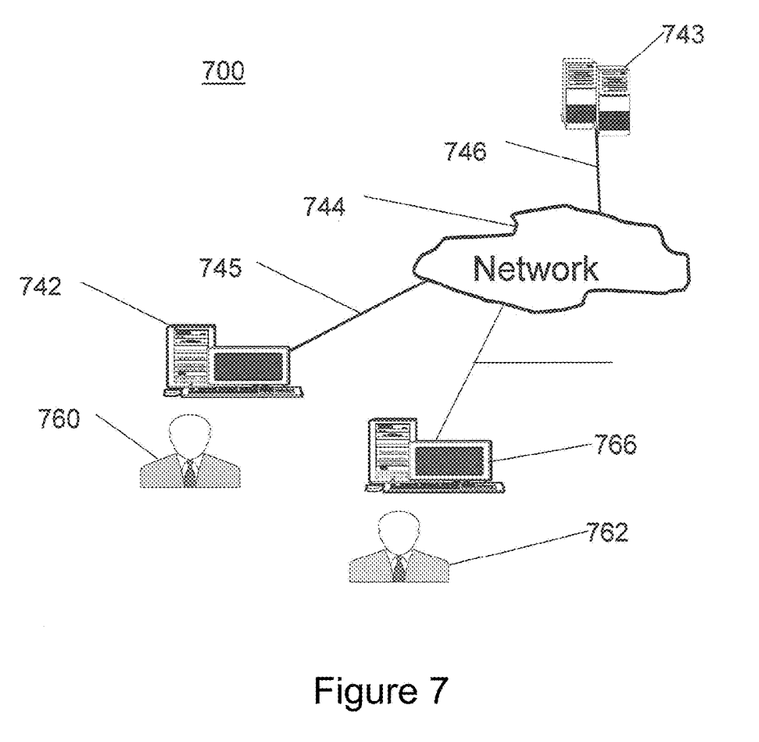
FIG. 7 is a block diagram of various example system components for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the object detection system 110). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of localization comprising:
generating an image from a camera at a pose;
receiving a pre-generated map;
determining features from the generated image based on edge detection;
predicting a pose of the camera based on at least the pre-generated map, and determining features from the predicted camera pose;
determining a Chamfer distance based upon the determined features from the image and the predicted camera pose;

optimizing the determined Chamfer distance based upon odometry information and epipolar geometry; and generating a camera pose estimate based on the optimization for an improved localization of the camera.

2. The method of claim 1, wherein the image is generated from a monocular camera.

3. The method of claim 1, wherein the pre-generated map is based upon LiDAR sensing.

4. The method of claim 1, wherein the optimization is performed by minimizing a cost function defined as:

$$C(P_k) = C_{chf}(P_k) + C_{epi}(P_{k-1}, P_k) + C_{odm}(P_{k-1}, P_k)$$

wherein $P_k$ is the estimated camera pose, $C_{odm}$ is the odometry information, $C_{epi}$ is the epipolar geometry, and $P_{k-1}$ is a previous camera pose wherein k is a time.

5. The method of claim 4, wherein the odometry information is defined as:

$$C_{odm}(P_{k-1}, P_k) = (d_k - |^{k-1}t_k|)^2,$$

wherein $d_k$ is a magnitude of a translation component of $D_k$, $D_k$ is a rigid transformation between a previous image and the image, and $t_k$ is a translation vector.

6. The method of claim 4, wherein the epipolar geometry is defined as:

$$C_{epi}(P_{k-1}, P_k) = \Sigma_i \tilde{x}_{i,k-1}{}^T F \tilde{x}_{i,k},$$

wherein $\tilde{x}$ is a homogenous coordinates of a point on the image, and F is a fundamental matrix.

7. The method of claim 1, wherein the edge detection is performed by a random forest based edge detector.

8. A system for localization comprising:
a camera configured to generate an image at a pose;
a memory;
a processor coupled to the memory and configured to:
receive a pre-generated map;
determine features from the generated image based on edge detection;
predict a pose of the camera based on at least the pre-generated map, and determine features from the predicted camera pose;
determine a Chamfer distance based upon the determined features from the image and the predicted camera pose;
optimize the determined Chamfer distance based upon odometry information and epipolar geometry; and
generate a camera pose estimate based on the optimized data for an improved localization of the camera.

9. The system of claim 8, wherein the cameras is a monocular camera.

10. The system of claim 8, wherein the pre-generated map is based upon LiDAR sensing.

11. The system of claim 8, wherein optimize is performed by minimizing a cost function defined as:

$$C(P_k) = C_{chf}(P_k) + C_{epi}(P_{k-1}, P_k) + C_{odm}(P_{k-1}, P_k)$$

wherein $P_k$ is the estimated camera pose, $C_{odm}$ is the odometry information, $C_{epi}$ is the epipolar geometry, and $P_{k-1}$ is a previous camera pose, wherein k is a time.

12. The system of claim 11, wherein the odometry information is defined as:

$$C_{odm}(P_{k-1}, P_k) = (d_k - |^{k-1}t_k|)^2,$$

wherein $d_k$ is a magnitude of a translation component of $D_k$, $D_k$ is a rigid transformation between a previous image and the image, and $t_k$ is a translation vector.

13. The system of claim 11, wherein the epipolar geometry is defined as:

$$C_{epi}(P_{k-1}, P_k) = \Sigma_i \tilde{x}_{i,k-1}{}^T F \tilde{x}_{i,k},$$

wherein $\tilde{x}$ is a homogenous coordinates of a point on the image, and F is a fundamental matrix.

14. The method of claim 8, wherein the edge detection is performed by a random forest based edge detector.

15. A non-transitory computer-readable recording medium having stored therein a program, which when executed by circuitry of a system, causes the system to:
generate an image from a camera at a pose;
receive a pre-generated map;
determine features from the generated image based on edge detection;
predict a pose of the camera based on at least the pre-generated map determine features from the predicted camera pose;
determine a Chamfer distance based upon the determined features from the image and the predicted camera pose;
optimize the determined Chamfer distance based upon odometry information and epipolar geometry; and
generate a camera pose estimate based on the optimized data for an improved localization of the camera.

16. The non-transitory computer-readable recording medium of claim 15, wherein the image is generated from a monocular camera.

17. The non-transitory computer-readable recording medium of claim 15, wherein the pre-generated map is based upon LiDAR sensing.

18. The non-transitory computer-readable recording medium of claim 15, wherein optimize is performed by minimizing a cost function defined as:

$$C(P_k) = C_{chf}(P_k) + C_{epi}(P_{k-1}, P_k) + C_{odm}(P_{k-1}, P_k)$$

wherein $P_k$ is the estimated camera pose, $C_{odm}$ is the odometry information, $C_{epi}$ is the epipolar geometry, and $P_{k-1}$ is a previous camera pose, wherein k is a time.

19. The non-transitory computer-readable recording medium of claim 18, wherein the odometry information is defined as:

$$C_{odm}(P_{k-1}, P_k) = (d_k - |^{k-1}t_k|)^2,$$

wherein $d_k$ is a magnitude of a translation component of $D_k$, $D_k$ is a rigid transformation between a previous image and the image, and $t_k$ is a translation vector.

20. The non-transitory computer-readable recording medium of claim 18, wherein the epipolar geometry is defined as:

$$C_{epi}(P_{k-1}, P_k) \Sigma_i \tilde{x}_{i,k-1} F \tilde{x}_{i,k},$$

wherein $\tilde{x}$ is a homogenous coordinates of a point on the image, and F is a fundamental matrix.

21. The non-transitory computer-readable recording medium of claim 15, wherein the edge detection is performed by a random forest based edge detector.

* * * * *